United States Patent [19]

Beyer

[11] Patent Number: 4,776,232

[45] Date of Patent: Oct. 11, 1988

[54] GEARBOX ARRANGEMENT FOR AN INDUSTRIAL ROBOT

[76] Inventor: Hasso Beyer, Kreuzbeckstr. 9, 8900 Augsburg, Fed. Rep. of Germany

[21] Appl. No.: 96,781

[22] Filed: Sep. 14, 1987

Related U.S. Application Data

[63] Continuation-in-part of Ser. No. 853,943, Apr. 21, 1986.

[30] Foreign Application Priority Data

Apr. 22, 1985 [DE] Fed. Rep. of Germany ... 8511948[U]

[51] Int. Cl.[4] .............................................. F16H 37/06
[52] U.S. Cl. .................................... 74/665 M; 901/29; 901/26
[58] Field of Search ............ 74/665 L, 665 M, 665 N; 901/25, 26, 29

[56] References Cited

U.S. PATENT DOCUMENTS

| | | | |
|---|---|---|---|
| 3,739,923 | 6/1973 | Totsuka | 901/29 X |
| 4,499,790 | 2/1985 | Helms | 901/26 X |
| 4,507,046 | 3/1985 | Sugimoto et al. | 901/29 X |
| 4,574,655 | 3/1986 | Kimura et al. | 901/26 X |
| 4,608,884 | 9/1986 | Beyer | 74/665 M X |
| 4,662,815 | 5/1987 | Zimmer | 901/26 X |
| 4,684,313 | 8/1987 | Minematsu et al. | 901/26 X |

FOREIGN PATENT DOCUMENTS

| | | | |
|---|---|---|---|
| 8401536 | 4/1984 | European Pat. Off. | 901/29 |
| A101222295 | 10/1984 | European Pat. Off. | |
| 2402829 | 5/1979 | Fed. Rep. of Germany | |
| 3048067 | 7/1982 | Fed. Rep. of Germany | |
| 0023188 | 6/1974 | Japan | 901/29 |

*Primary Examiner*—Dirk Wright
*Attorney, Agent, or Firm*—Hill, Van Santen, Steadman & Simpson

[57] ABSTRACT

A gearbox arrangement for an industrial robot comprises a flange element, a pivoting element and a rotating element adapted to move independently of each other, and having two trains of gears, comprising drive-shafts for connection to respective drive means, for separately driving the said flange element and pivoting element. Reduction gears are inserted between the two gear-trains and the flange and pivoting elements. The trains of gears in the rotating element are branched through the intermediate shafts and lateral shafts arranged with their axes in parallel with the axes of the drive-shafts. Such a structure permits the use of small diameter shafts and gears for a compact arrangement. In addition, it permits the use of spur gears at appropriate locations which are inexpensive and relatively easy to install, maintain and service to keep the low tolerances needed for industrial robots.

9 Claims, 2 Drawing Sheets

GEARBOX ARRANGEMENT FOR AN INDUSTRIAL ROBOT

This is a continuation-in-part of application Ser. No. 853,943, filed Apr. 21, 1986.

FIELD OF THE INVENTION

The invention relates to a gearbox arrangement for an industrial robot and of the type comprising a flange element, a pivoting element and a rotating element adapted to move independently of each other, and having two trains of gears, comprising respective drive-shafts, for driving the said flange element and the pivoting element, respective reduction gears being inserted between the two gear-trains and the flange and pivoting elements.

REVIEW OF THE PRIOR ART

Gearbox arrangements of the general type mentioned above are already known. In one shown, for example, in German Patent Application AS No. 24 02 829, the reduction gears are inserted between the driving motors, driving the gear-trains and the gearbox. In this way, the gear-trains passing through the rotating element already rotate slowly and there is therefore no need to provide any additional reduction gears in the rotating and pivoting elements of this known industrial robot hand. Thus, in this known industrial robot hand, as compared with one comprising reduction gears in the rotating element, the pivoting element or the flange element, additional useful space is available and it is therefore possible to design the slowly rotating drive-shafts in the form of hollow shafts of relatively large diameter. These, in turn, drive lateral shafts carrying spur gears which are also of relatively large diameter. However, the concept of reduction gears at the motor end, i.e. slowly rotating drive-shafts, has certain not inconsiderable disadvantages. More particularly, any play in the transmission after the reduction gears has a substantially greater effect than before the reduction gears. Because the drive-shafts rotate slowly, they must be of relatively large diameter and a relatively high torque must be transferred. Moreover, bearings for large diameter shafts cost more than bearings for shafts of smaller diameter.

In the case of other known gearboxes of the type specified, described for example in German Publication Document No. OS 30 48 067 and European Patent No. A1-0122 259, the reduction gears are arranged at the end, or near to the end, of the gear-trains in the pivoting element or flange element. However, these reduction gears take up a certain amount of room and consequently an arrangement of the type disclosed in German Patent Application No. AS 24 02 829 is difficult or no longer possible, since the resulting large dimensions of the hand would restrict its applicability. The latter gearbox arrangements therefore comprise branching of the gear-trains in the rotating element through intermediate shafts arranged at right angles to the drive-shafts, which cooperate with one another through bevel gearing. On the driven side, the intermediate shafts transfer the driving power through respective toothed belts to the pivoting element and flange element. Because the intermediate shafts are arranged at right angles to the drive-shafts, this arrangement required relatively costly bearings due to the introduction and transfer of torques at axially spaced locations on the intermediate shafts. In addition to this, the adjustments of the intermediate shafts that are rendered necessary by the use of bevel gears raises considerable difficulties. In particular, it is difficult to adjust the unit as a whole in such a manner as to ensure satisfactory meshing and a minimum of losses. Moreover, the bevel geared intermediate shafts require a significant amount of maintenance. Moreover, the toothed belts used in these units for transferring driving power are not an optimal solution for all requirements and under all operating conditions.

DEFINITION OF THE INVENTION

It is the principal purpose of the present invention to provide a gearbox for an industrial robot which, on the one hand, will produce a sufficiently compact industrial robot hand, even if reduction gears are inserted between the gear-trains and the flange and pivoting elements and, on the other hand, will be as free as possible from transmission inaccuracies and risks of failure.

In accomplishing the above-mentioned purpose, the invention teaches, initially and essentially, that the drive-trains in the rotating element are branched through intermediate and lateral shafts disposed with their axes in parallel with the drive-shaft axes. An arrangement of this kind has the advantage of consisting entirely of shafts meshing with each other through teeth. There is no intercalation of other machine parts associated with major inaccuracies and risks of failure. Moreover, branching of the drive-trains through intermediate and lateral shafts arranged with axes in parallel is also more satisfactory fom the point of view of bearing forces, since there is at least no torque to be taken up in the axially parallel intermediate shafts, as in the case of known intermediate shafts arranged at right angles to the axes of the drive-shafts. Furthermore, the intermediate and lateral shafts provided in the gearbox arrangement according to the invention are very easy to adjust and maintain. This not only provides a highly accurate and relatively simple gearbox arrangement for an industrial robot hand, but the said hand is also surprisingly compact in the branching area also. Branching the drive-trains through axially parallel intermediate shafts makes it possible to use gears of relatively small diameter on the drive-shafts, intermediate shafts and lateral shafts. Last, but not least, the transmission of power in a gearbox arrangement according to the teaching of the invention can be accomplished by the use of simple spur-gears, thus reducing considerably the need for costly bevel gearing.

The intermediate shafts preferably consist of stationary axial journals with ring gears mounted rotatably thereon. This makes it easy to arrange the axle-journals stationarily in the rotating element, i.e. there is no need for a bearing providing the axle-journal with a degree of freedom. Replacement of an intermediate shaft, which is hardly ever necessary under normal operating conditions, may thus be carried out merely by releasing the axle-journal from its anchorage, whereupon the said journal can be replaced by a new journal already fitted with the rotatable ring gear. Furthermore, the intermediate shaft may be arranged in such a manner that the end of the axle-journal not secured in the rotating element is easily accessible, thus contributing still further to easy maintenance.

DESCRIPTION OF THE PREFERRED EMBODIMENTS

According to a preferred example of the invention, the lateral shafts are also provided with spur gears at one end, to wit the end meshing with the intermediate shafts. Thus, the lateral shafts are also provided, at least at one end, with advantageously simple spur gearing. This is not only favourable from the production point of view, but also from the point of view of assembly costs.

Another preferred configuration relates to a gearbox arrangement comprising, in addition to the elements already mentioned above, a transmission shaft and a pivoting element shaft which are in alignment with each other and also constitute the axis of rotation of the pivoting element. In an arrangement of this kind, provision is made, according to the invention, for the pivoting element shaft also to consist of a stationary axle-journal with a ring gear secured rotatably thereto. A configuration of this kind basically provides the advantages described hereinbefore in connection with the intermediate shaft. Although it is particularly advantageous to provide this configuration relating to the pivoting element shaft in a gearbox arrangement comprising the generic characteristics mentioned at the beginning hereof, possibly in combination with one or more of the characteristics described in connnection with the teaching according to the invention, it is not necessary, in order to achieve success with this configuration, for all of the generic characteristics to be put into practice. For instance, the industrial robot hand need not necessarily comprise a flange element, a pivoting element and a rotating element, nor need the drive-shafts pass through the rotating element in order to drive the flange element and the pivoting element. It is also not necessary to insert reduction gears between the gear-trains and the flange and pivoting elements.

The preceding comments regarding the presence of one or more of the generic characteristics, or characteristics according to the invention described hereinafter also apply to another configuration, according to the invention, of the pivoting element shaft described hereinafter.

According to this configuration, the pivoting element shaft is mounted in the rotating element and the pivoting element. This provides advantages as regards the design of the pivoting element and the bearings required for the pivoting element shaft. The one necessary bearing for the pivoting element shaft in the pivoting element also permits an advantageously compact configuration of the pivoting element in this area, without impairing the reliability of the bearing for the pivoting element shaft. This latter configuration is naturally particularly advantageous in conjunction with the previously described configuration of the pivoting element shaft in the form of a stationary axle-journal with a rotatably attached ring gear, since in this case the bearings in both the pivoting element and the rotating element may with advantage be of quite simple design.

In still another preferred configuration according to the invention, the drive-shafts comprise spur gearing at the rotating element end. If use is made of this characteristic also, then all of the gears in the vicinity of the branching of the gear-trains in the rotating element will be spur gears.

DESCRIPTION OF THE DRAWINGS

The invention is explained and described hereinafter in conjunction with the accompanying drawing, which illustrates a single embodiment and wherein:

As already indicated, FIG. 1 is a side elevation view of an industrial robot 16 with a manoeuverable hand 17 mounted on a boom 19, the hand 17 comprising a rotating element 12, a pivoting element 13, and a rotating flange element 18, the said elements being adapted to rotate or pivot in the directions of the respective arrows 12a, 13a and 18a, shown in FIG. 1. Thus, any desired operating point within the operating range of boom 19 and hand 17 can easily be reached.

Various tools for special purposes may be fitted as required to flange element 18 for use in conjunction with robot 16, for example welding tongs, spray guns for painting, grippers, or the like.

Figure 1:
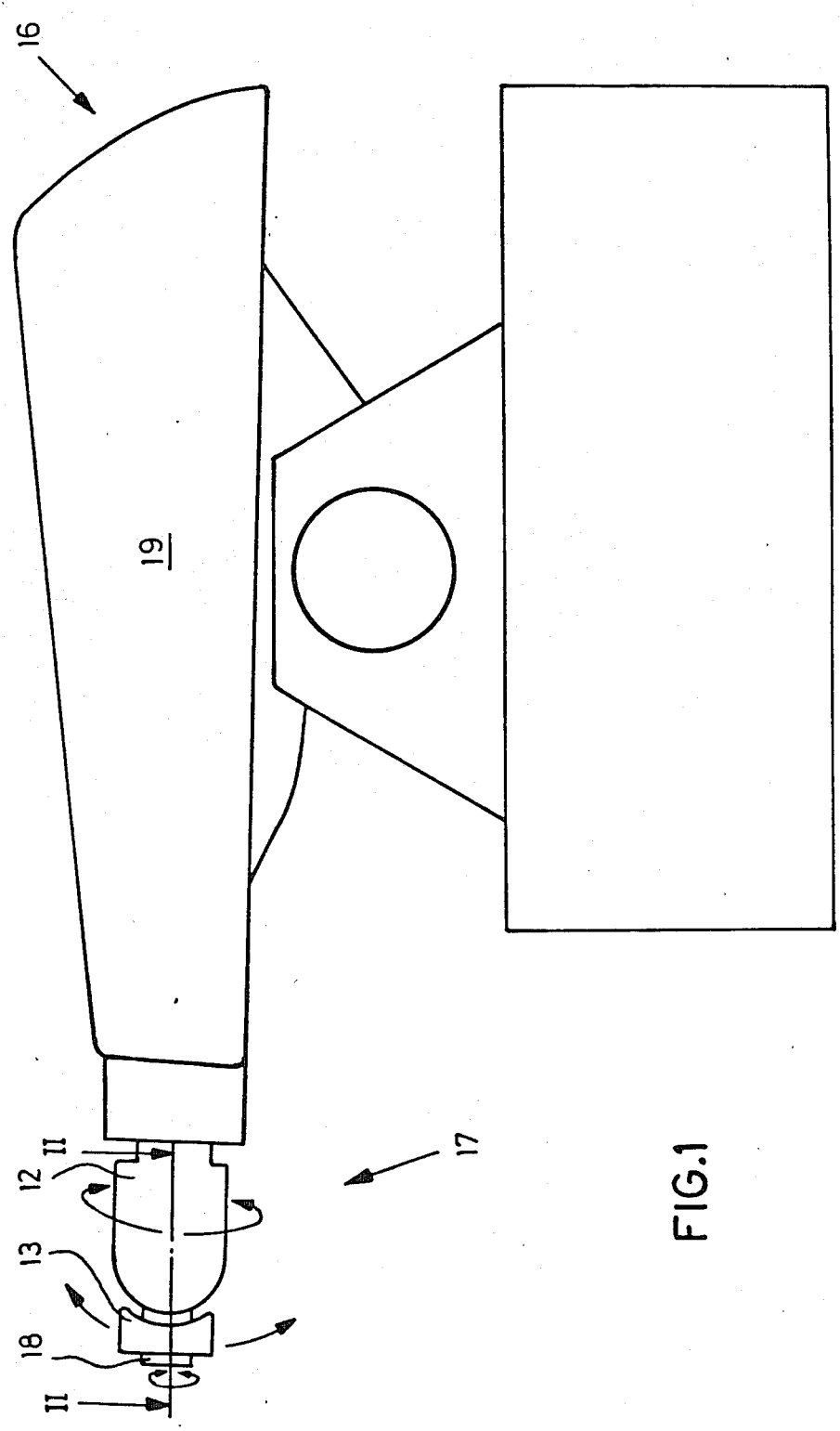
FIG. 1 is a general side elevational view of an industrial robot incorporating the invention.
Figure 2:
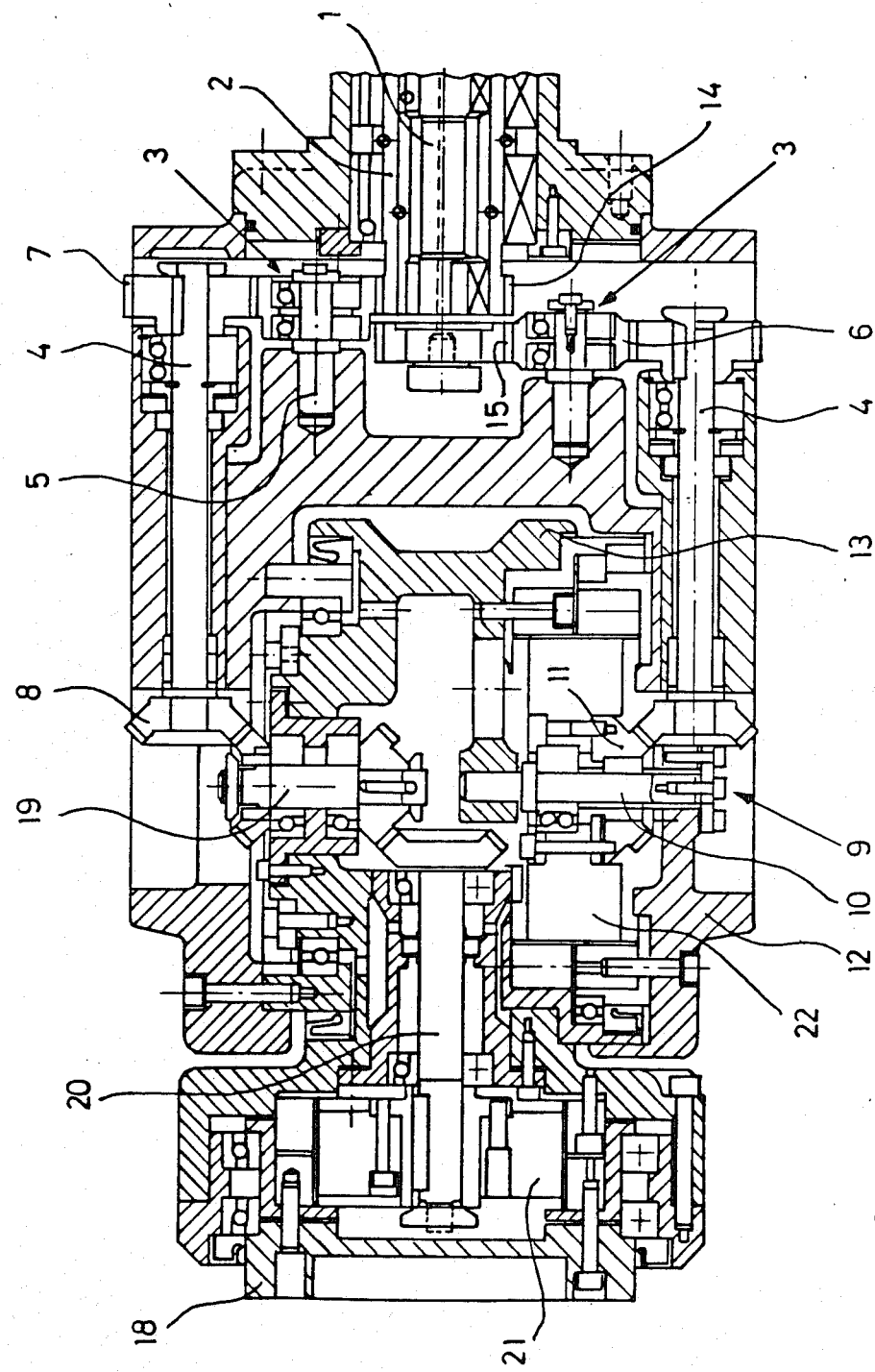
FIG. 2 is a cross-section along the line II—II through the hand of the industrial robot illustrated in FIG. 1.

Referring now to FIG. 2, a gearbox arrangement for driving the hand 17 from suitable drive motors (not shown) consists initially of two coaxial drive-shafts 1 and 2 which protrude into rotating element 12 of industrial robot hand 17 and which branch off therein to respective gear-trains. According to the invention, branching of the gear-trains in the rotating element 12 is effected by respective intermediate shafts 3 and respective lateral shafts 4, respectively arranged with their axes in parallel with the axes of the said drive-shafts. Thus, outer drive-shaft 2 drives the flange element 18, causing it to rotate about the longitudinal axis of flange element shaft 20 to which it is connected via reduction gear 21, the drive conection to shaft 2 being through spur gear 14, upper intermediate shaft 3, upper lateral shaft 4, transmission shaft 19, arranged with its axis at right angles to that of lateral shaft 4 and thus at right angles to that of drive-shaft 2, and through the flange element shaft 20 which has its axis also parallel to that of drive-shaft 2 and lateral shaft 4. Similarly, drive-shaft 1 drives pivoting element 13, causing it to pivot about an axis parallel with the longitudinal axis of pivoting element shaft 10, the drive connection being through spur gear 15, lower intermediate shaft 3, lower lateral shaft 4 and pivoting element shaft 10, running at right angles to lateral shaft 4 and thus to drive-shaft 1. In this embodiment, the axis of rotation of flange element 18 coincides with the axis of flange element shaft 20, while the pivot axis of pivoting element 13 coincides with the axes of pivoting element shaft 9 and transmission shaft 19, which are mutually coincident. As with the gear-train for flange element 18, a reduction gear 22 is inserted in the gear-train consisting of drive-shaft 1, lower intermediate shaft 3, lower lateral shaft 4 and pivoting element shaft 9, just before the final element of the gear-train.

The said reduction gears need not necessarily be inserted between the final element in the gear-trains, i.e. respectively between flange element shaft 20 and pivoting element shaft 9, and flange element 18 and pivoting element 13, but this is preferable. It would instead, for example, be possible for the reduction gear 21 to cooperate with transmission shaft 19, i.e. to face the reduction gear 22 in FIG. 2. In this case, flange element shaft 20 would be connected directly to flange element 18 and would rotate correspondingly slowly. Reduction gears 21 and 22 may, in principle, be of any desired type, but so-called "harmonic-drive" gears are preferred.

Intermediate shafts 3 consist individually of a stationary axle-journal and a respective ring gear 6 mounted rotatably thereon. This facilitates assembly of the shafts in rotating element 12 in that they are accessible upon removal of the element body from the portion carrying the drive shafts 1 and 2. It also facilitates repair or replacement, should this be necessary.

Whereas drive-shafts 1 and 2 and intermediate shafts 3 carry only spur gearing, lateral shafts 4 have spur gears 7 at their input ends to mesh with ring gears 6 and bevel gears 8 at the other, the latter meshing with the respective bevel gears on transmission shaft 19 and on pivoting element shaft 9. This relatively simple gearing has various advantages, for example the trains are easy to assemble, inexpensive to manufacture, they run quietly and the like.

Like the intermediate shafts 3, pivoting element shaft 9 consists of a stationary axle-journal 10 with a ring gear 11 secured rotatably thereto and meshing with the respective bevel gear. As already indicated, the said ring gear is a bevel gear. Pivoting element shaft 9 is therefore mounted both in rotatihg element 12 and in pivoting element 13. This is associated with the advantages of the invention already described above.

The embodiments of the invention in which an exclusive property or privilege is claimed are defined as follows:

1. A gearbox arrangement for an industrial robot comprising a flange element, a pivoting element and a rotating element adapted to move independently of each other, and having first and second trains of gears in the rotating element comprising drive-shafts for connection to respective drive means, the first gear train being adapted to drive the said flange element via a first reduction gear and the second gear train being adapted to drive said pivoting element via a second reduction gear characterized in that:
   said drive shafts are arranged for rotation about a common axis;
   there are only two trains of gears;
   said first reduction gear is arranged between the first gear train and the flange element in the pivoting element;
   the second reduction gear is arranged between the second gear train and the pivoting element in the rotating element; and
   each of said two gear trains is branched through an intermediate shaft (3) and a lateral shaft (4), both said shafts being arranged with their axes in parallel with the common axis of said drive-shafts and inside the rotating element.

2. A gearbox arrangement as in claim 1, wherein said coaxial drive shaft includes an inner and an outer drive member, one of which is gearingly connected to an intermediate shaft parallel to said drive shaft, a lateral shaft gearingly connected to said intermediate shaft and parallel to said drive shaft, a transmission shaft gearingly connected to the lateral shaft and at right angles thereto, a flange element shaft gearingly connected to said transmission shaft at one end and positioned at right angles to said transmission shaft, and said flange element shaft secured to a reduction gear at its other end.

3. A gearbox arrangement as in claim 1, wherein one of said coaxial drives gearingly connects to an intermediate shaft parallel thereto, said lateral shaft being gearingly connected to said intermediate shaft and parallel to said drive shaft, and the other end of the intermediate shaft gearingly connected to a reduction gear.

4. A gearbox arrangement according to claim 1, characterized in that the intermediate shafts (3) consist of a stationary axle-journal (5) and a ring gear (6) mounted rotatably upon the said axle-journal.

5. A gearbox arrangement according to claim 4, characterized in that the lateral shafts (4) have a spur gear (7) at the input end and a bevel gear (8) at the other end.

6. A gearbox arrangement according to claim 1, and also comprising a pivoting element shaft, characterized in that the pivoting element shaft (9) consists of a stationary axle-journal (10) and a ring gear (11) secured rotatably thereto.

7. A gearbox arrangement according to claim 6, characterized in that the pivoting element shaft (9) is mounted in the rotating element (12) and the pivoting element (13).

8. A gearbox arrangement according to claim 1, characterized in that the drive-shafts (1, 2) comprise respective spur gears (15, 14) at the rotating element end.

9. A gearbox arrangement for an industrial robot comprising a flange element, a pivoting element and a rotating element adapted to move independently of each other and having only two trains of gears, extending through said rotating element to said pivoting element and flange element, comprising only two coaxial drive shafts connected to respective drive means and entering said rotating element for separately driving said flange element and said pivoting element, one of said gear-trains connected to one of said shafts and one of said flange elements or said pivoting element, and the other of the gear-trains connected to the other of the shafts and the other of the flange element or said pivoting element, each of said gear-trains being branched through intermediate and lateral shafts arranged with their axes parallel with the axes of the drive-shafts and arranged inside the rotating element, each of said gear trains also including reduction gears between the respective drive shafts and pivoting element or flange element and adjacent the respective pivoting element or flange element so as to minimize transmission inaccuracies, provide a compact gear-train, and provide a gear-train which is rotationally faster between the drive shaft and the reduction gears than between the reduction gears and respective pivoting element or flange element.

* * * * *